(12) United States Patent
Amireh et al.

(10) Patent No.: US 8,564,547 B2
(45) Date of Patent: Oct. 22, 2013

(54) TOUCH SCREEN REMOTE CONTROL DEVICE FOR USE WITH A TOY

(75) Inventors: Nicholas Amireh, Los Angeles, CA (US); Vladimir Sosnovskiy, Valley Village, CA (US)

(73) Assignee: Mattel, Inc., El Segundo, CA (US)

( * ) Notice: Subject to any disclaimer, the term of this patent is extended or adjusted under 35 U.S.C. 154(b) by 714 days.

(21) Appl. No.: 12/424,433

(22) Filed: Apr. 15, 2009

(65) Prior Publication Data

US 2009/0256822 A1    Oct. 15, 2009

Related U.S. Application Data

(60) Provisional application No. 61/124,322, filed on Apr. 15, 2008, provisional application No. 61/124,554, filed on Apr. 16, 2008.

(51) Int. Cl.
*G06F 3/041* (2006.01)

(52) U.S. Cl.
USPC .......... 345/173; 345/156; 446/454; 178/18.01

(58) Field of Classification Search
USPC ............ 345/156, 173–178; 178/18.01–20.04; 446/454, 456
See application file for complete search history.

(56) References Cited

U.S. PATENT DOCUMENTS

| | | |
|---|---|---|
| 3,516,176 A | 6/1970 | Cleary |
| 3,840,086 A | 10/1974 | Burton |
| 4,272,916 A | 6/1981 | Giordano |
| 4,550,221 A | 10/1985 | Mabusth |
| 4,766,368 A | 8/1988 | Cox |
| 5,012,124 A | 4/1991 | Hollaway |
| 5,100,153 A | 3/1992 | Welte |
| 5,128,599 A | 7/1992 | Nikolaus |
| 5,195,920 A | 3/1993 | Collier |
| 5,413,518 A | 5/1995 | Lin |
| 5,457,289 A | 10/1995 | Huang |
| 5,488,204 A | 1/1996 | Mead |
| 5,579,036 A | 11/1996 | Yates, IV |
| 5,650,597 A | 7/1997 | Redmayne |
| 6,208,341 B1 | 3/2001 | van Ee |
| 6,239,790 B1 | 5/2001 | Martinelli |
| 6,373,265 B1 | 4/2002 | Morimoto |
| 6,390,883 B1 | 5/2002 | Choi |
| 6,439,956 B1 | 8/2002 | Ho |
| 6,496,021 B2 | 12/2002 | Tartagni |
| 6,497,608 B2 | 12/2002 | Ho |
| 6,633,281 B2 | 10/2003 | Lin |

(Continued)

FOREIGN PATENT DOCUMENTS

| | | |
|---|---|---|
| CA | 2572909 | 1/2006 |
| DE | 20007271 | 7/2000 |

(Continued)

OTHER PUBLICATIONS

Hasbro and IRobot, "My Real Baby," Nov. 2000, 8 pages.

(Continued)

*Primary Examiner* — Dmitriy Bolotin
(74) *Attorney, Agent, or Firm* — Kolisch Hartwell, PC

(57) ABSTRACT

A remote control device having a touch screen for remotely directing a toy, such as a remote control vehicle or airplane, is provided.

12 Claims, 3 Drawing Sheets

(56) References Cited

U.S. PATENT DOCUMENTS

| | | | |
|---|---|---|---|
| 6,661,239 B1 | 12/2003 | Ozick | |
| 6,705,873 B2 | 3/2004 | Higashida | |
| 6,750,852 B2 | 6/2004 | Gillespie | |
| 6,925,357 B2 | 8/2005 | Wang | |
| 6,940,291 B1 | 9/2005 | Ozick | |
| 7,044,245 B2 | 5/2006 | Anhalt | |
| 7,143,017 B2 | 11/2006 | Flynn | |
| 7,170,301 B1 | 1/2007 | Hsieh | |
| 7,217,192 B2 | 5/2007 | Nishiyama | |
| 7,221,113 B1 | 5/2007 | Young | |
| 7,235,046 B2 | 6/2007 | Anhalt | |
| 7,236,161 B2 | 6/2007 | Geaghan | |
| 7,291,054 B2 | 11/2007 | Choi | |
| 7,436,395 B2 | 10/2008 | Chiu | |
| 7,731,588 B2 * | 6/2010 | Templeman | 463/38 |
| 7,889,175 B2 * | 2/2011 | Kryze et al. | 345/156 |
| 7,952,564 B2 * | 5/2011 | Hurst et al. | 345/173 |
| 8,054,299 B2 * | 11/2011 | Krah | 345/174 |
| 8,330,639 B2 * | 12/2012 | Wong et al. | 341/176 |
| 2002/0132556 A1 * | 9/2002 | So | 446/456 |
| 2003/0035075 A1 | 2/2003 | Butler | |
| 2003/0060906 A1 * | 3/2003 | Kim | 700/56 |
| 2003/0067451 A1 | 4/2003 | Tagg | |
| 2003/0178534 A1 * | 9/2003 | Peltz et al. | 246/187 A |
| 2005/0048918 A1 | 3/2005 | Frost | |
| 2005/0153624 A1 | 7/2005 | Wieland | |
| 2005/0162404 A1 | 7/2005 | Chiu | |
| 2005/0253022 A1 * | 11/2005 | Peltz et al. | 246/187 A |
| 2005/0277470 A1 * | 12/2005 | Watanachote | 463/37 |
| 2006/0223637 A1 * | 10/2006 | Rosenberg | 463/47 |
| 2006/0229034 A1 * | 10/2006 | Gizis et al. | 455/95 |
| 2006/0261771 A1 | 11/2006 | Anhalt | |
| 2006/0284849 A1 | 12/2006 | Grant | |
| 2007/0008299 A1 * | 1/2007 | Hristov | 345/173 |
| 2007/0080845 A1 | 4/2007 | Amand | |
| 2007/0125100 A1 | 6/2007 | Shoenfeld | |
| 2007/0156286 A1 | 7/2007 | Yamauchi | |
| 2007/0229465 A1 | 10/2007 | Sakai | |
| 2007/0249422 A1 | 10/2007 | Polodoff | |
| 2007/0271078 A1 | 11/2007 | Flynn | |
| 2007/0293124 A1 | 12/2007 | Smith | |
| 2008/0009237 A1 * | 1/2008 | Wu | 454/256 |
| 2008/0014833 A1 | 1/2008 | Bozzone | |
| 2008/0027590 A1 | 1/2008 | Phillips | |
| 2008/0027591 A1 | 1/2008 | Lenser | |
| 2008/0082208 A1 | 4/2008 | Hong | |
| 2008/0142281 A1 * | 6/2008 | Geaghan | 178/18.06 |
| 2008/0261696 A1 * | 10/2008 | Yamazaki et al. | 463/39 |
| 2009/0156251 A1 * | 6/2009 | Cannistraro et al. | 455/557 |
| 2011/0156943 A1 * | 6/2011 | Wong et al. | 341/176 |

FOREIGN PATENT DOCUMENTS

| | | |
|---|---|---|
| DE | 60113552 | 6/2006 |
| DE | 102007041563 | 3/2009 |
| DE | 112007001291 | 4/2009 |
| EP | 0564164 | 5/1997 |
| JP | 2000126461 | 5/2000 |
| JP | 2000126465 | 5/2000 |
| JP | 2005000504 | 1/2005 |
| WO | 2005043484 | 5/2005 |
| WO | 2006005635 | 1/2006 |
| WO | 2008013568 | 1/2008 |

OTHER PUBLICATIONS

International Search Authority, International Search Report and Written Opinion for Application No. PCT/US2009/40717, Jul. 17, 2009.

State Intellectual Property Office of the People's Republic of China, Office Action for Chinese Application No. 200980122619.7, Mar. 4, 2013, 14 pages.

Deutsches Patent—Un Markenamt; Office Action for German Application No. 11 2009 000 941.7; Nov. 9, 2012; 13 pages including English translation.

World International Patent Organization (Beate Gioffo-Schmitt, Authorized Officer); International Preliminary Report on Patentability for PCT/US2009/040717; Oct. 19, 2010; 6 pages.

* cited by examiner

TOUCH SCREEN REMOTE CONTROL DEVICE FOR USE WITH A TOY

CROSS REFERENCE TO RELATED APPLICATIONS

This application claims priority under 35 U.S.C. §119(e) to U.S. Provisional Patent Application Nos. 61/124,322 entitled "Touch Screen Remote Control Device for Use with a Toy", filed Apr. 15, 2008, and 61/124,554, entitled "Touch Screen Remote Control Device for Use with a Toy", filed Apr. 16, 2008, the disclosures of which are incorporated here by reference.

BACKGROUND

Examples of toys including remote control devices, touch screens, and capacitive sensing used in connection with toys are found in the following patents, published patent applications, and other publications: U.S. Pat. Nos. 4,272,916, 5,413,518, 6,661,239, 6,705,873, 6,940,291, 7,044,245, 7,221,113, US20050048918, US20050162404, US20050179672, and Canadian Patent No. CA2572909.

The disclosures of all the patent application publications, patents, and other publications recited in this application are incorporated herein by reference in their entirety for all purposes.

SUMMARY OF THE DISCLOSURE

The present disclosure provides for a remote control device having a touch screen for remotely directing a toy. One or more capacitive sensing elements, in the form of touch pads, are located beneath the touch screen. Each capacitive sensing element represents a direction and/or a speed. Each touch pad is capable of detecting contact of the touch screen by an object, such as a human finger. When the touch screen is contacted by a human finger or other object in the region of the touch pad, the remote control transmits a signal to the toy to move in the direction and at the speed represented by the touch pad that sensed reduced capacitance.

The advantages of the present invention will be understood more readily after consideration of the drawings and Detailed Description below.

DETAILED DESCRIPTION

Figure 1:
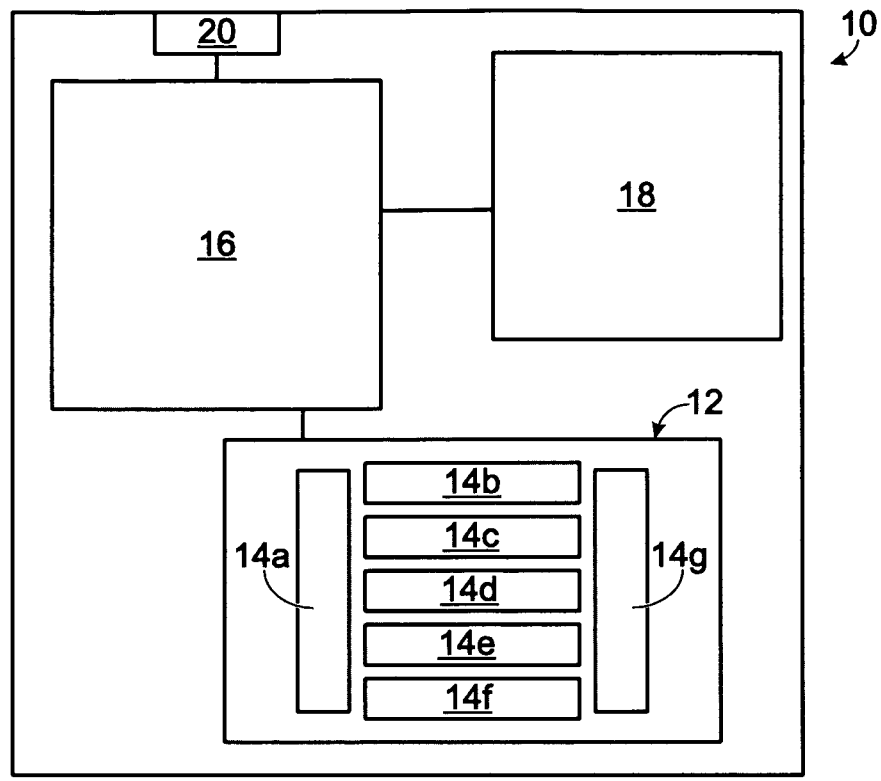
FIG. 1 is a block diagram of an example of a remote control device having a touch screen including capacitive touch pads.

FIG. 1 shows an example remote control device 10 including a touch screen 12, one or more capacitive touch sensors 14$a$-$g$, a control circuit 16, a power source 18, and a transmitter 20. Remote control device 10 may remotely direct a toy, such as a remote control vehicle or airplane, by sensing the location of an object on touch screen 12 and transmitting control signals to the toy. Specifically, the control signals transmitted by remote control device 10 may control the speed and direction of the toy.

Touch screen 12 may be a display which can detect the presence and/or location of a touch or contact within the display area by objects such as a finger, a hand, or a stylus. Touch screen 12 may or may not include a display, such as a computer-style interface including animated images. In such an embodiment, a user may be able to interact with the animated images simply by touching touch screen 12. Additionally, the animated images may change based upon a perceived contact with touch screen 12 or other factors specific to the particular implementation. In its simplest foe, however, touch screen 12 may be a plastic surface of the housing on device 10, with or without printed or painted graphics. For example, touch screen 12 may include directional arrows indicating the direction a remote control vehicle would be directed if that area of touch screen 12 were contacted.

Touch screen 12 may include a protective layer. For example, touch screen 12 may be coated with a material, such as indium tin oxide or a similar material that may conduct a continuous electrical current across touch screen 12. Such a protective layer allows touch screen 12 to be capacitive and therefore capable of sensing contact with an object, such as a finger.

Touch screen 12 may also include one or more capacitive touch sensors 14$a$-$g$. Touch sensors 14$a$-$g$ may be manufactured using conventional etching of printed circuit boards. Each touch sensor 14$a$-$g$ may represent a direction and/or speed. For example, touch sensors 14$a$-$g$ may represent a direction such as forward, backward, left, or right, and/or a speed such as stop, standard, or turbo. Each touch sensor 14$a$-$g$ may be connected to control circuit 16.

As shown in FIG. 1, touch sensors 14$a$-$g$ may be arranged in a grid formation including a central region and two side regions. Touch sensors included in the central region may designate a speed and either forward or backward, and touch sensors in the two side regions may designate left or right. Some embodiments may also include a "stop pad" in the central region which does not represent a speed or direction.

Control circuit 16 may include electronics such as memory, programmed instructions stored in memory, and a processor. In addition to being connected to touch sensor(s) 14$a$-$g$, control circuit 16 may be connected to power source 18 and transmitter 20. Power source 18 may be composed of one or more conventional batteries and may supply power to control circuit 16. Control circuit may energize one more touch sensors 14$a$-$g$ by a pulse and monitor touch sensors 14$a$-$g$ for a variation in capacitance. When a variation is detected, control circuit 16 may determine which touch sensor(s) 14$a$-$g$ had a variance in capacitance and the speed and/or direction that touch sensor(s) represents.

Control circuit 16 may then send the appropriate control signal to transmitter 20. For example, if control circuit 16 detects a variance in capacitance on the touch sensor representing "left," control circuit 16 may then send the appropriate control signal to transmitter 20. Transmitter 20 may send a remote control vehicle the appropriate directional and/or speed signals upon receipt of the control signal(s) from control circuit 16. Transmitter 20 may be a resistor-capacitor radio control or an infrared transmission circuit.

Remote control device 10 may be capable of allowing a user to touch two different touch sensors simultaneously, causing the toy to go in both directions. For example, if touch sensors representing "forward" and "left," respectively, device 10 may transmit signals causing a remote control vehicle to move in both directions. Device 10 may continue to transmit both directional and/or speed control signals until contact with touch sensors 14*a-g* ceases. Control circuit 16 may include programming to prohibit certain combinations of conflicting directional control signal from being transmitted. For example, programming may prohibit "forward" and "backward" or "left" and right" control signals from being simultaneously transmitted.

In an alternative embodiment, control circuit 16 may include programming that may cause device 10 to continue to transmit control signals to direct the remote control vehicle in one or more directions even after contact has ceased with touch sensor(s) 14*a-g*. The programming in such an embodiment may cause device 10 to continue to transmit control signals until another directional and/or speed touch sensor 14*a-g* has been contacted. For example, if the touch sensors representing, "forward" and "right" were contacted, device may continue to transmit both of those signals although contact with those touch sensors had ceased and would continue to transmit those signals until another directional and/or speed touch sensor was contacted.

Figure 2:
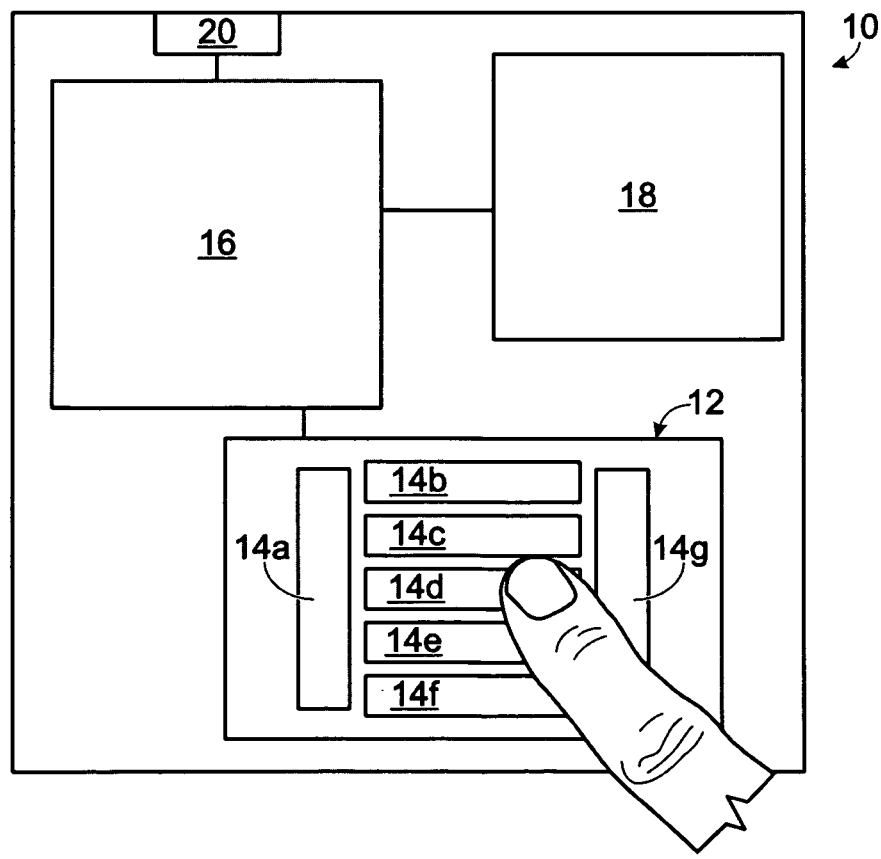
FIG. 2 is a block diagram of an example of a remote control device having a touch screen including capacitive touch pads showing a human finger contacting the touch screen.

FIG. 2 shows and example of a remote control device 10 having a finger contacting one or more touch sensor(s) 14*a-g*. As explained above with reference to FIG. 1, when a finger contacts touch sensor(s) 14*a-g*, control circuit 16 may detect the variance in capacitance caused by the finger contacting the pad(s). Depending upon which pad(s) 14*a-g* were contacted by the finger, device 10 may transmit directional and/or speed signals to a remote control vehicle.

Figure 3:
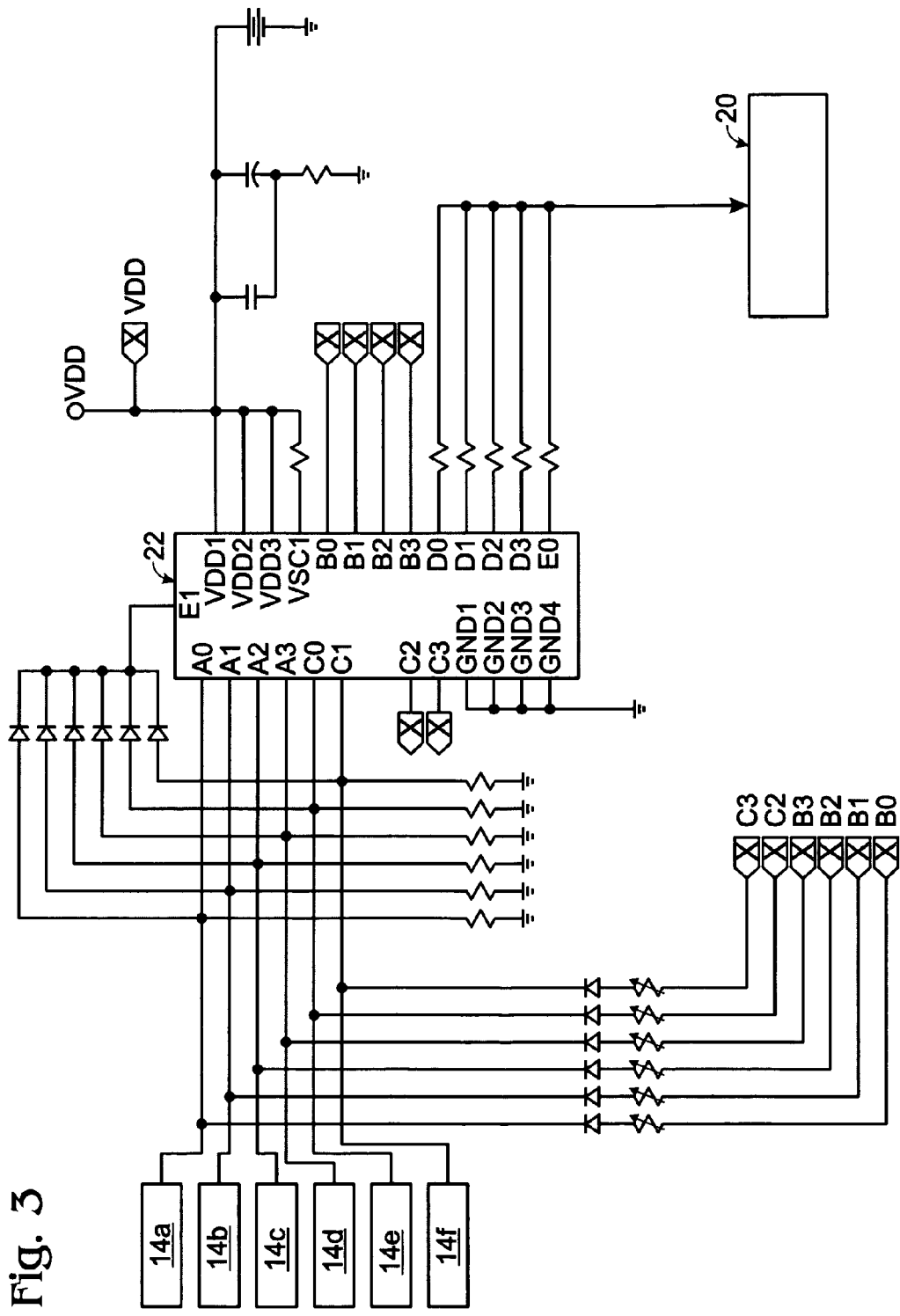
FIG. 3 is an electrical schematic of an exemplary control circuit for use in a remote control device including capacitive touch pads.

FIG. 3 shows an example of an electrical schematic that may be implemented in a control circuit 16 of a remote control device 10 having a touch screen 12 including one or more capacitive touch sensors 14*a-g*. In the example control circuit 16 of FIG. 3, six capacitive touch sensors 14*a-f* are active and each represents a direction and/or speed. Control circuit 16 may include a microcontroller 22, such as a model AM4ED010X manufactured by Alpha Microelectronics, Corp. of Hsinchu, Taiwan. Control circuit 16, through microcontroller 22, energizes touch sensors 14*a-f* by creating a pulse through output E1, then monitors for decay in the pulse. When control circuit senses decay in the pulse, contact has been made with one or more of the touch sensors 14*a-f*.

Upon detection of decay in the pulse, control circuit 16 determines which touch sensor(s) 14*a-f* have been contacted. Control circuit 16 then creates a directional and/or speed control signal based on which touch sensor(s) 14*a-f* control circuit 16 sensed was contacted. Control circuit 16, through microcontroller 22 may then send directional and/or speed control signals to transmitter 20 based upon which touch sensor(s) 14*a-f* were contacted.

Figure 4:
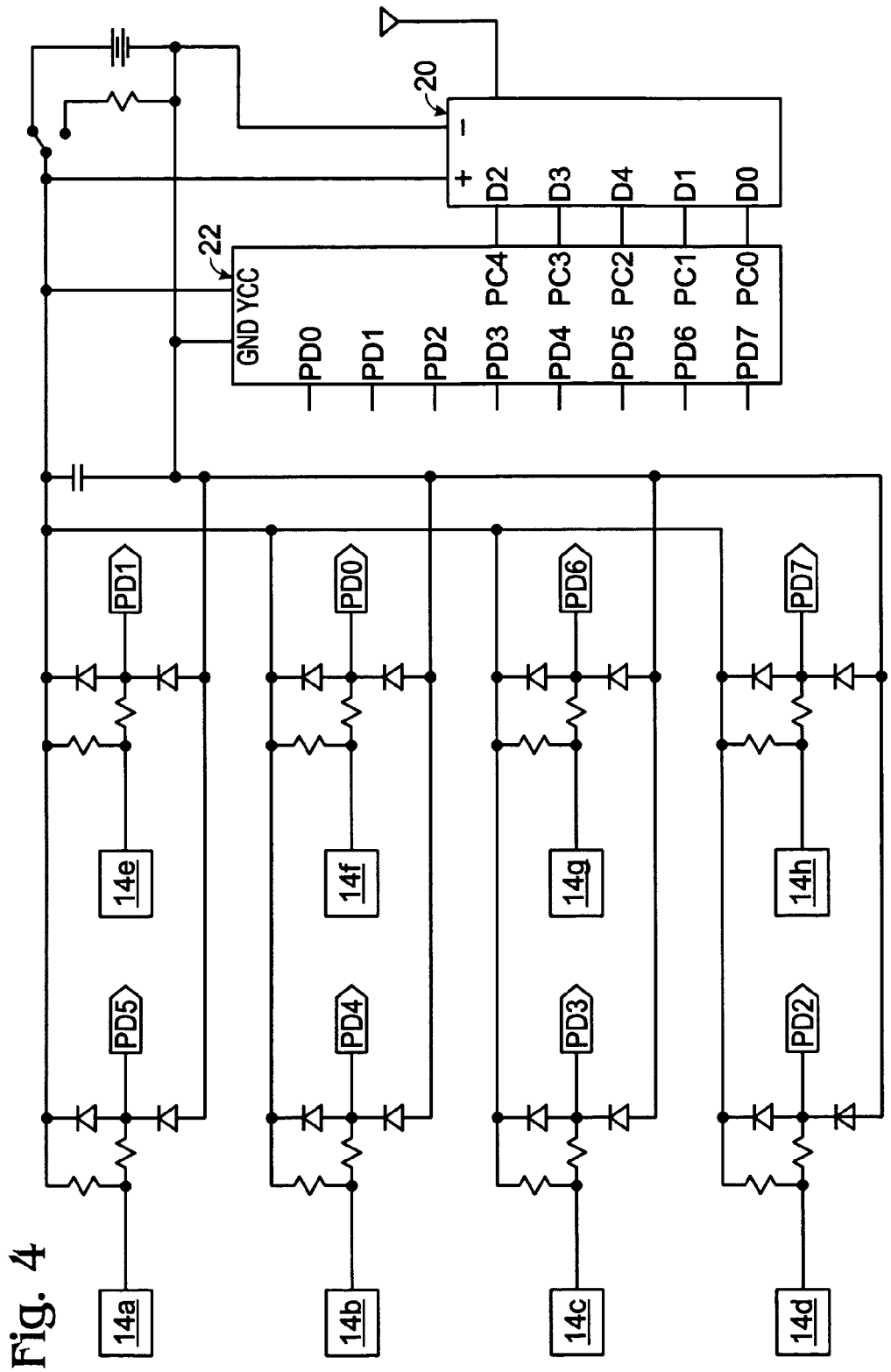
FIG. 4 is an electrical schematic of an exemplary control circuit for use in a remote control device including capacitive touch pads.

FIG. 4 shows an alternative embodiment of an electrical schematic that may be implemented in control circuit 16 of a remote control device 10 having eight active touch sensors 14*a-h* and including a microcontroller 22. Unlike the exemplary control circuit shown in the schematic of FIG. 3, control circuit 16 of FIG. 4 includes a single set of I/O lines to discharge touch sensors 14*a-h* and detect any deviation in capacitance caused by contacting a touch sensor with an object, such as a finger. Control circuit 16, through microcontroller 22 may be connected to transmitter 20, such as a 27 MHz/49 MHZ radio module, that may transmit control signals to a remote control vehicle.

Control circuit 16, as shown in FIG. 4, may measure the capacitance of touch sensors 14*a-h* by first discharging the capacitance of touch sensors 14*a-h* then measuring the charge time. Alternatively, control circuit 16 may initially charge the capacitance of the touch sensors 14*a-h* then measure the discharge time. In each of these embodiments, control circuit 16 is able to sense a variance in the capacitance of touch sensors 14*a-h*, determine which touch sensor(s) were contacted, and provide appropriate control signals to a transmitter for transmission to a remote control vehicle.

While embodiments of a remote control device having a touch screen for use with a toy have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in a related application. Such variations, whether different, broader, narrower or equal in scope, are also regarded as included within the subject matter of the present disclosure. An appreciation of the availability or significance of the claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A remote control device for controlling a remote control vehicle comprising:

a touch surface including one or more capacitive touch sensors, each touch sensor corresponding to one or more of a direction and a speed of the remote control vehicle;

a control circuit connected to each of the one or more touch sensors, the control circuit being configured to energize the touch sensors and to detect variance in capacitance of the touch sensors; and a transmitter connected to the control circuit and configured to transmit control signals;

wherein upon detection of variance in the capacitance of the one or more sensing elements the transmitter transmits control signals corresponding to the direction and speed represented by the sensing element in which a variance in capacitance was detected, wherein the control circuit energizes the one or more touch sensors by a pulse and wherein the control circuit monitors the one or more touch sensors for decay in the pulse to determine when an object has contacted one or more of the touch sensors.

2. The remote control device of claim 1 wherein the transmitter is a resistor-capacitor radio control.

3. The remote control device of claim 1 wherein the transmitter is an infrared transmission circuit.

4. The remote control device of claim 1 wherein the touch surface further includes a display having animated images.

5. The remote control device of claim 4 wherein the display is configured to change the animated images based upon a perceived contact with the touch surface.

6. A touch-controlled transmitter for use with a remote-controlled toy, comprising:

a touch surface having a plurality of capacitive touch sensors, the touch surface divided into:

a central region having a plurality of speed-designating sensors, and at least two side regions each having at least one direction-designating sensor; and an electronic controller configured to:

change an output speed of the remote-controlled toy as a different one of the speed-designating sensors is activated, maintain an output speed of the remote-controlled toy at a current setting as a different one of the direction-designating sensors is activated, and change an output direction of the remote-controlled toy as a different one of the direction-designating sensors is activated, wherein the one or more speed-designating and direction-designating sensors are activated when the electronic controller senses a variance in the capacitance of the sensor, wherein the electronic controller (1) energizes the touch sensors by a pulse and (2) monitors the touch sensors for decay in the pulse to determine when an object has contacted one or more of the touch sensors.

7. A remote control vehicle controller comprising:

a capacitive touch surface comprising one or more touch sensors arranged in a grid, the touch sensors being energized by a pulse; and electronics that perceive a human finger contacting the touch surface by monitoring variation in a rate of decay and creating one or more of a directional control signal and a speed control signal for controlling a remote control vehicle based on the perceived location of the finger on the grid of touch sensors, wherein the electronics (1) energize the one or more touch sensors by a pulse and (2) monitor the touch sensors for decay in the pulse to determine when an object has contacted one or more of the touch sensors.

8. The remote control vehicle controller of claim 7 wherein the control signals are transmitted by a resistor-capacitor radio control.

9. The remote control vehicle controller of claim 7 wherein the control signals are transmitted by an infrared transmission circuit.

10. A method of controlling a toy comprising the steps of:

energizing one or more capacitive touch sensors, wherein the step of energizing one or more capacitive touch sensors includes energizing by a pulse;

detecting a variance in capacitance on a capacitive touch sensor, wherein the step of detecting a variance in capacitance includes monitoring the touch sensor for decay in the pulse;

determining a direction and speed of the toy represented by the touch sensor in which a variance in capacitance is detected; and transmitting a control signal corresponding to the direction and speed represented by the touch sensor in which a variance in capacitance is detected.

11. The method of claim 10 further comprising displaying animated images.

12. The method of claim 11 wherein the step of displaying animated images includes changing the animated images based upon a detected variance in capacitance on the touch sensor.

\* \* \* \* \*